Jan. 12, 1960
J. P. ZAIDAN
2,921,175
BROILER
Filed Feb. 15, 1957
3 Sheets-Sheet 1
Fig. 1
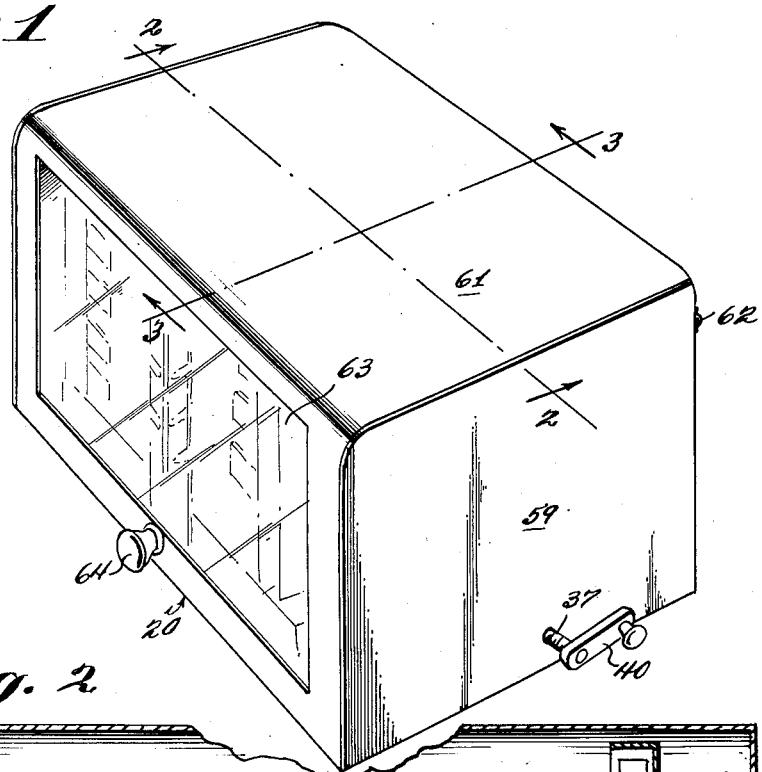
Fig. 2
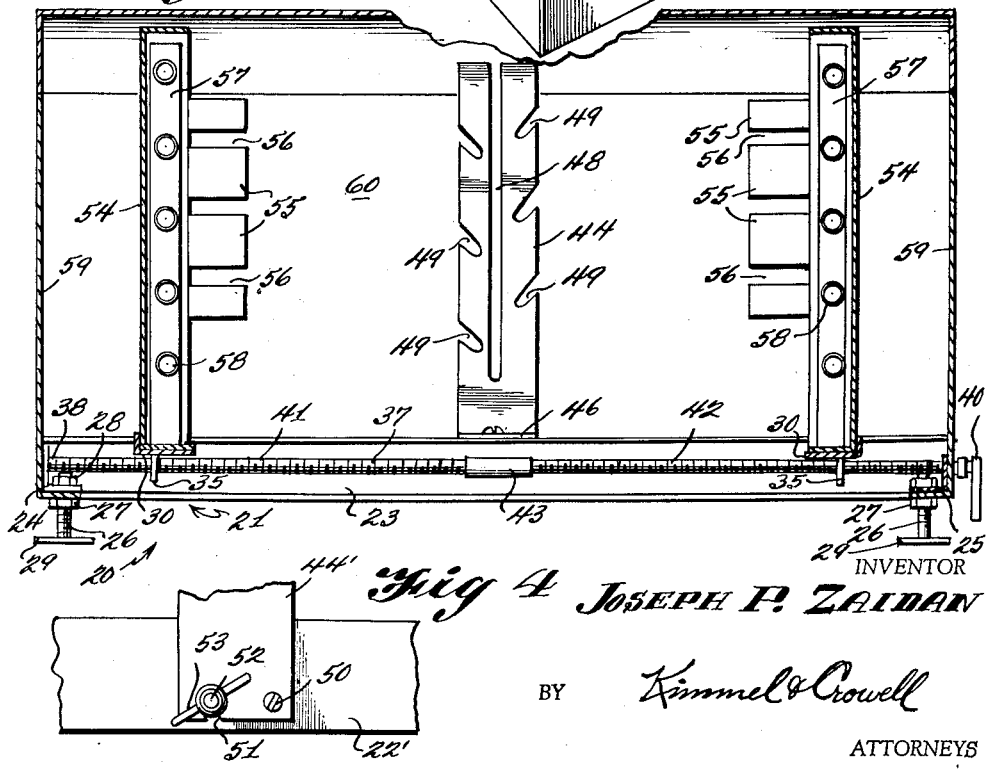
Fig. 4
INVENTOR
JOSEPH P. ZAIDAN
BY Kimmel & Crowell
ATTORNEYS Jan. 12, 1960    J. P. ZAIDAN    2,921,175
BROILER
Filed Feb. 15, 1957    3 Sheets-Sheet 2
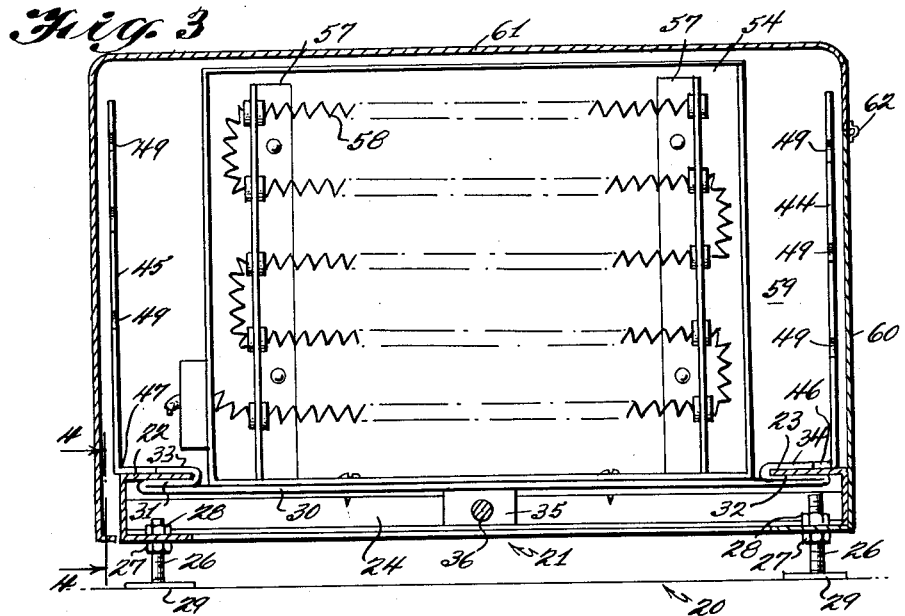
Fig. 3
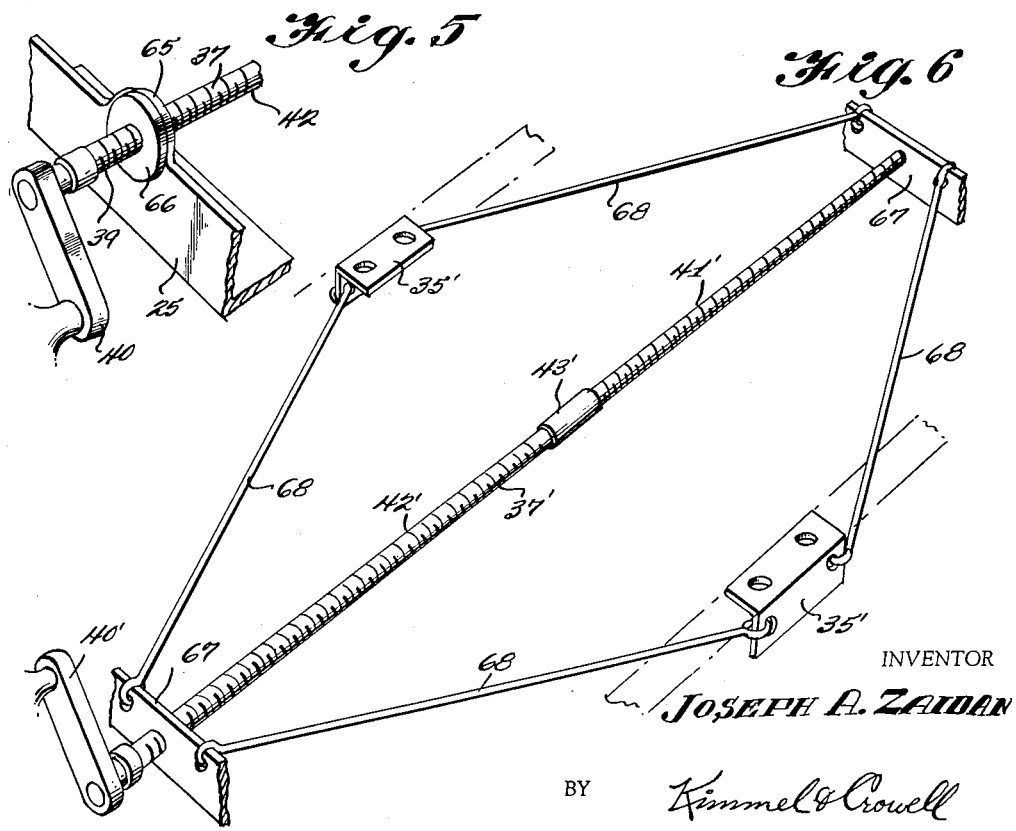
Fig. 5
Fig. 6
INVENTOR
JOSEPH P. ZAIDAN
BY
Kimmel & Crowell
ATTORNEYS Jan. 12, 1960 J. P. ZAIDAN 2,921,175
BROILER
Filed Feb. 15, 1957 3 Sheets-Sheet 3

INVENTOR
JOSEPH P. ZAIDAN
BY Kimmel & Crowell
ATTORNEYS

United States Patent Office 2,921,175
Patented Jan. 12, 1960

2,921,175
BROILER

Joseph P. Zaidan, Philadelphia, Pa.

Application February 15, 1957, Serial No. 640,473

1 Claim. (Cl. 219—35)

The present invention relates to broilers, and more particularly to adjustable broilers which can be used for bulky as well as relatively thin food materials.

The primary object of the invention is to provide a broiler having movable burners which can be adjusted toward the center of the broiler from a position outside of the broiler.

Another object of the invention is to provide a broiler structure of the class described above in which the cooking area is provided with a hinged cover for preventing contamination of the food being cooked.

A further object of the invention is to provide a broiler of the class described above which is inexpensive to manufacture, simple to use, and which can, with equal facility have gas burners or electric burners incorporated therein.

Other objects and advantages will become apparent in the following specification when considered in the light of the attached drawings, in which:

Figure 1 is a perspective view of the invention with the cover in closed position.

Figure 2 is a longitudinal cross-section taken along the line 2—2 of Figure 1, looking in the direction of the arrows.

Figure 3 is a transverse cross-section taken along the line 3—3 of Figure 1, looking in the direction of the arrows.

Figure 4 is a fragmentary end elevation of a modified form of support mounting.

Figure 5 is a fragmentary perspective view of the adjusting crank and mounting.

Figure 6 is a fragmentary perspective view of the adjusting linkage.

Figure 7:
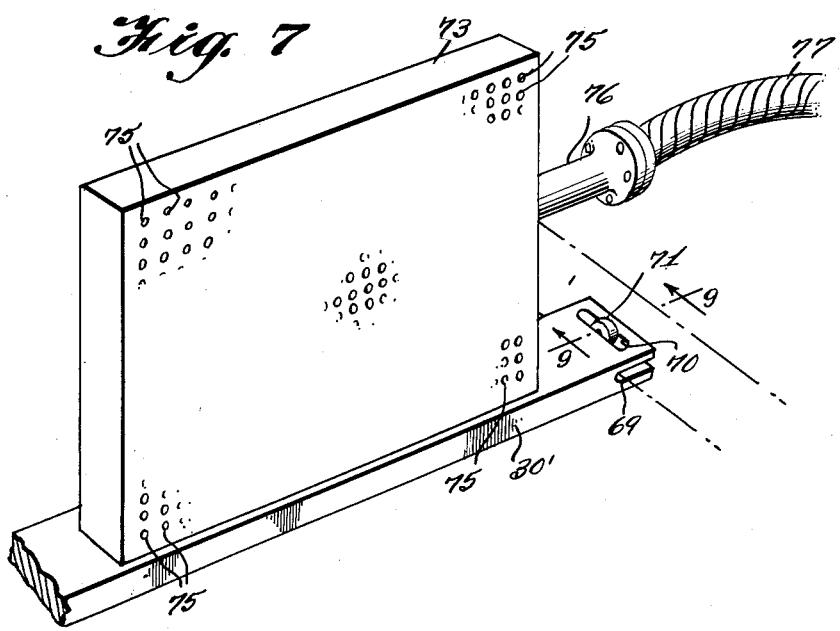
Figure 7 is a fragmentary perspective view of the burner side of a gas fired burner used in the broiler.

Referring now to the drawings in detail wherein like reference characters indicate like parts throughout the several figures, the reference numeral 20 indicates generally a broiler constructed in accordance with the invention.

The broiler 20 is provided with a frame, generally indicated at 21, and includes a pair of spaced parallel channel members 22 and 23 having their respective opposite ends connected by a pair of spaced parallel angle iron frame members 24 and 25, respectively. The frame 21 is supported at each corner by a plurality of threaded legs 26. The threaded legs 26 extend through the horizontal portions of the angle irons 24 and 25 and are adjustably secured thereto by means of nuts 27 and 28. Each of the threaded legs 26 is provided with a foot 29 for engagement with the table or other supporting surface.

A pair of burner support plates 30 are arranged in spaced parallel relation extending between the channel members 22 and 23. The opposite ends of the burner support plates 30 are arranged to underlie one side, respectively, of each of the channel members 22 and 23 and is reverted at 31 and 32 forming support for additional reverted portions 33 and 34 which are arranged to overlie the wall of the channels 22 and 23, respectively, so as to support the burner support plates 30 therefrom for movement thereon as a track. The burner support plates 30 are each provided with medially arranged depending brackets 35.

The depending brackets 35 are each provided with axially aligned oppositely threaded bores 36 through which extends a shaft 37. The shaft 37 has one end thereof 38 journalled in the upright portion of the angle iron frame member 24, and the opposite end 39 thereof journalled in the upright portion of the angle iron frame member 25 and extending therethrough with a hand crank 40 mounted on the outer end thereof.

The shaft 37 is formed of two oppositely threaded portions 41 and 42 joined together by a coupling 43 intermediate the angle iron frame members 24 and 25. Rotation of the shaft 37 by means of the crank 40 will move the depending brackets 35 simultaneously toward the center of the broiler 20 and when rotated in a reverse direction will move them simultaneously away from the center.

A pair of upstanding plates 44 and 45 are each provided with horizontally extending feet 46 and 47, respectively, which engage the channel members 23 and 22, respectively, and are secured thereto by any suitable means. The upstanding plates 44 and 45 are each provided with a medial elongated vertical slot 48 and a plurality of aligned angular notches 49 from the opposite side edges thereof. The elongated slots 48 are adapted to support a meat carrying pin (not shown) of conventional construction, while the aligned angular notches 49 are adapted to support shishkebab pins and similar support pins.

A modified upstanding plate 44' is illustrated in Figure 4, wherein the lower portion of the upstanding plate 44' is connected to the channel 22' by means of a pivot fastener 50 and the upstanding plate 44' is retained in an upright position on the channel member 22' by means of a slot 51 in the lower edge portion thereof which engages over a bolt 52 and is secured thereon by means of a wing nut 53. With this structure, as illustrated in Figure 4, the upstanding plates 44' may be collapsed along side of the channel members 22' when it is desired to move them out of the way during some uses of the broiler 20.

Open sided burner housings 54 are positioned on the burner support plates 30 and extend upwardly therefrom. A plurality of forwardly projecting extensions 55 are arranged in aligned relation on opposite side edges of the housings 54 so as to form notches 56 for additional support of meat carrying pins. The housings 54 are each provided with a pair of spaced parallel electric heater coil supporting members 57, and a resistance type electric heating coil 58 is supported therein, as best illustrated in Figure 3.

Opposite end walls 59 and a back wall 60 are secured to the channel members 23 and the angle iron frame members 24 and 25 in any suitable manner such as welding or the like. The combination and front wall 61 is hinged at 62 to the upper edge of the back wall 60 so as to completely cover the broiler 20. The combined cover and front wall 61 is provided with a heat resistant window 63 fastened therein in any suitable manner. A handle 64 is secured to the cover and front wall 61 for opening same when desired.

In Figure 5 of the drawings, an enlarged detail of the burner moving mechanism is illustrated showing how the angle iron frame member 25 is provided with an upstanding projection 65 through which the shaft 37 extends. A bushing 66 is mounted on the shaft 37 to prevent the shaft 37 from moving relative to the angle iron frame member 25.

In Figure 6 a modified form of burner moving mechanism is illustrated wherein a shaft 37' extends transversely of the broiler 20 and is provided with oppositely threaded end portions 41' and 42' joined by a central coupling 43'. The shaft 37' has its opposite ends journalled in the channel members 22 and 23 instead of the angle iron frame members 24 and 25 as in the case of the preferred form of the invention. A crank 40' is connected to the shaft 37' to permit its rotation. Depending brackets 35' are secured to the burner support plates 30.

A pair of threaded plates 67 are threadedly engaged with opposite ends of the shaft 37' and are adapted to move inwardly on the shaft 37' upon rotation thereof in one direction, and outwardly thereon upon rotation thereof in the other direction. Links 68 have their opposite ends pivotally connected to adjacent portions of the depending brackets 35' and the threaded plates 67. Movement of the threaded plates 67 toward the center of the shaft 37' will cause the depending brackets 35' to separate, moving the burner support plates 30 mounted thereon apart, and movement of the shaft 37' in the opposite direction will move the threaded plates 67 apart and draw the depending brackets 35' together.

The structure illustrated in Figure 6 permits the hand crank 40 thereof to project out the forward or rear side of the broiler 20 instead of one end, as is the case in the preferred form of the invention.

Figure 8:
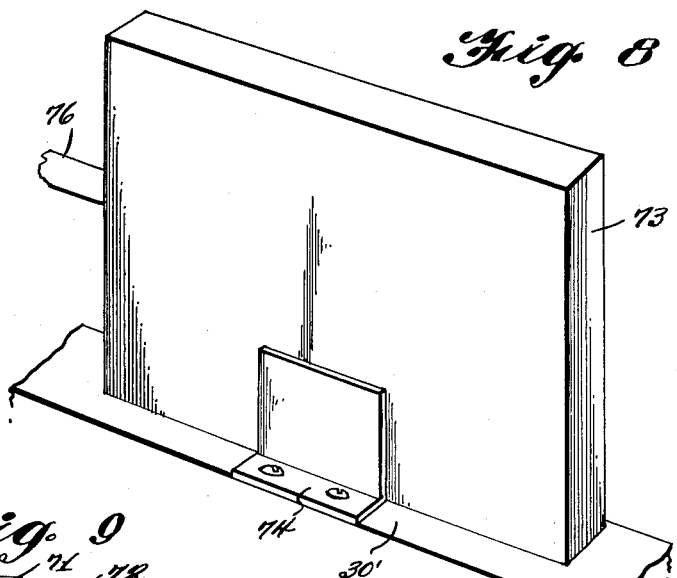
Figure 8 is a perspective view showing the opposite side of the burner shown in Figure 7.
Figure 9:
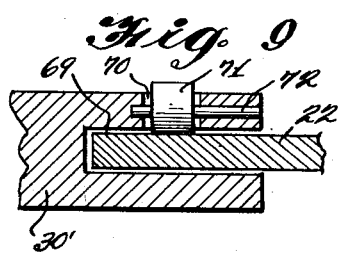
Figure 9 is an enlarged fragmentary longitudinal cross-section taken along the line 9—9 of Figure 7, looking in the direction of the arrows.

A modified form of the invention is illustrated in Figures 7 through 9 wherein a relatively heavy burner support plate 30' is provided with a horizontal groove 69 in each end thereof. A transverse horizontal groove 70 is arranged above the slot 69 and communicates therewith, as best illustrated in Figures 7 and 9.

A roller 71 is positioned in the transverse slot 70 on a longitudinally extending pivot pin 72. The roller 71 projects downwardly into the horizontal groove 69 for engagement with the upper wall of the channel members 22 and 23. In this modification, the roller 71 supports the weight of the burner support plate 30', reducing the frictional resistance to the movement thereof on the channel members 22 and 23.

A gas burner 73 is supported on the burner support plate 30' by means of an upstanding bracket 74, as best seen in Figure 8. The gas burner 73 is provided with a plurality of burner orifices 75 through which gas and air are emitted for heating the broiler 20. A supply pipe 76 extends from the gas burner 73 and has a flexible gas line 77 connected thereto by any suitable means.

As can be seen, the present invention is readily adaptable to both electric and gas burners and the burners can be transversely adjusted to vary the cooking time for following desired recipes as well as to provide for the cooking of various materials. Furthermore, the present invention is portable and can be used directly at the table, or in the kitchen.

Having thus described the preferred embodiments of the invention, it should be understood that numerous structural modifications and adaptations may be resorted to without departing from the scope of the appended claim.

What is claimed is:

In a broiler of the kind described, an outer housing having side, end and top walls, a rectangular framework in said housing carried by certain of said walls, a shaft extending from front to rear of said housing, and having two sets of opposite threads, a pair of vertically disposed electrical heating element burner housings in said outer housing, a pair of plates threadedly engaged on opposite ends of said shaft for simultaneous linear movement in opposite directions with respect to each other, depending brackets carried by said burner housings, a plurality of links each pivotally connected at one end to a bracket and at its other end to a plate whereby both plates and brackets are linked to each other, and means for rotating said shaft to effect movement of said plates, links and brackets, and hence burner housings, said burner housings each comprising integrally formed back and side walls and each of said side walls having spaced apart corresponding rows of notches extending deeply inwardly of the edge of each of said side walls for supporting food supports, said burner housings each having a pair of spaced parallel electric heater coil supporting members, and electrical resistance type heating coils mounted on said heater coil supporting members, the latter being inwardly spaced from said burner housing side walls, and stationary means including corresponding rows of angled notches centrally of said broiler unit for supporting food to be cooked between said burners.

References Cited in the file of this patent

UNITED STATES PATENTS

| | | |
|---|---|---|
| 570,957 | Richards | Nov. 10, 1896 |
| 917,195 | Van Aller | Apr. 6, 1909 |
| 1,228,956 | Noonan | June 5, 1917 |
| 1,251,232 | Hubbard | Dec. 25, 1917 |
| 1,398,157 | Segar | Nov. 22, 1921 |
| 1,713,303 | Serrell | May 14, 1929 |
| 1,862,077 | Demmerle | June 7, 1932 |
| 2,030,047 | Bonzagni | Feb. 11, 1936 |
| 2,502,685 | Warner | Apr. 4, 1950 |
| 2,542,335 | Kapit, et al. | Feb. 20, 1951 |
| 2,565,000 | Schultz | Aug. 21, 1951 |
| 2,851,575 | Walston et al. | Sept. 9, 1958 |

FOREIGN PATENTS

| | | |
|---|---|---|
| 391 | Great Britain | Jan. 9, 1886 |